United States Patent
Mugunda et al.

(10) Patent No.: US 10,534,728 B2
(45) Date of Patent: Jan. 14, 2020

(54) SYSTEMS AND METHODS FOR PROVIDING ADAPTABLE VIRTUAL BACKPLANE SUPPORT FOR PROCESSOR-ATTACHED STORAGE RESOURCES

(71) Applicant: Dell Products L.P., Round Rock, TX (US)

(72) Inventors: Chandrasekhar Mugunda, Austin, TX (US); Yogesh P. Kulkarni, Round Rock, TX (US); Balaji Bapu Gururaja Rao, Austin, TX (US); Shivabasava Karibasa Komaranalli, Austin, TX (US); Robert R. Leyendecker, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/946,006

(22) Filed: Apr. 5, 2018

(65) Prior Publication Data
US 2019/0310951 A1  Oct. 10, 2019

(51) Int. Cl.
*G06F 13/10* (2006.01)
*G06F 13/16* (2006.01)

(52) U.S. Cl.
CPC ........ *G06F 13/105* (2013.01); *G06F 13/1668* (2013.01); *G06F 2213/0026* (2013.01)

(58) Field of Classification Search
CPC .................................................. G06F 13/105
See application file for complete search history.

(56) References Cited

U.S. PATENT DOCUMENTS

| | | | | |
|---|---|---|---|---|
| 5,214,775 A | * | 5/1993 | Yabushita | G06F 12/0284 711/117 |
| 7,002,961 B1 | * | 2/2006 | Lane | H04Q 3/0025 370/218 |
| 789,536 A1 | * | 2/2011 | Vasquez | G06F 13/387 709/223 |
| 8,443,114 B2 | * | 5/2013 | Lambert | G06F 3/0689 710/13 |
| 9,210,065 B2 | * | 12/2015 | Hao | G06F 9/45558 |
| 2017/0220415 A1 | * | 8/2017 | Hashimoto | G06F 11/1068 |
| 2017/0357609 A1 | * | 12/2017 | Long | G06F 13/16 |
| 2018/0048592 A1 | * | 2/2018 | Worley | H04L 49/30 |

* cited by examiner

*Primary Examiner* — Elias Mamo
(74) *Attorney, Agent, or Firm* — Jackson Walker L.L.P.

(57) ABSTRACT

A method may include, in an information handling system comprising a processor and a management controller communicatively coupled to the processor and configured to provide management of the information handling system, executing by the management controller a management application for management of one or more storage resources of the information handling system, determining by the management controller whether one or more processor-attached storage resources are present in the information handling system, wherein the one or more processor-attached storage resources are coupled to the processor by other than a backplane of the information handling system, and responsive to determining that one or more processor-attached storage resources are present, executing by the management controller an adaptable virtual backplane that emulates a physical backplane to the management application as if the physical backplane were interfaced between the management application and the processor-attached storage resources.

15 Claims, 3 Drawing Sheets

SYSTEMS AND METHODS FOR PROVIDING ADAPTABLE VIRTUAL BACKPLANE SUPPORT FOR PROCESSOR-ATTACHED STORAGE RESOURCES

TECHNICAL FIELD

The present disclosure relates in general to information handling systems, and more particularly to systems and methods for providing adaptable virtual backplane support for processor-attached storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ storage resources for storing data. Historically, many information handling systems included backplanes which served as an interface between a processor motherboard and storage resources. However, an emerging trend are architectures which permit connection of Peripheral Component Internet Connect Express (PCIe) solid state drives directly to PCIe lanes on a motherboard, which may be referred to as processor-attached drives. However, such architectures introduce complication and complexity into development, as many applications that run within a management controller assume that storage resources are coupled via a physical backplane. Accordingly, functionality provided by such applications, including thermal support and real-time drive monitoring, cannot often be supported for processor-attached drives using traditional approaches.

SUMMARY

In accordance with the teachings of the present disclosure, the disadvantages and problems associated with processor-attached storage resources may be reduced or eliminated.

In accordance with embodiments of the present disclosure, an information handling system may include a processor and a management controller communicatively coupled to the processor and configured to provide management of the information handling system. The management controller may further configured to execute a management application for management of one or more storage resources of the information handling system, determine whether one or more processor-attached storage resources are present in the information handling system, wherein the one or more processor-attached storage resources are coupled to the processor by other than a backplane of the information handling system, and responsive to determining that one or more processor-attached storage resources are present, execute an adaptable virtual backplane that emulates a physical backplane to the management application as if the physical backplane were interfaced between the management application and the processor-attached storage resources.

In accordance with these and other embodiments of the present disclosure, a method may include, in an information handling system comprising a processor and a management controller communicatively coupled to the processor and configured to provide management of the information handling system, executing by the management controller a management application for management of one or more storage resources of the information handling system, determining by the management controller whether one or more processor-attached storage resources are present in the information handling system, wherein the one or more processor-attached storage resources are coupled to the processor by other than a backplane of the information handling system, and responsive to determining that one or more processor-attached storage resources are present, executing by the management controller an adaptable virtual backplane that emulates a physical backplane to the management application as if the physical backplane were interfaced between the management application and the processor-attached storage resources.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to, in an information handling system comprising a processor and a management controller communicatively coupled to the processor and configured to provide management of the information handling system, execute by the management controller a management application for management of one or more storage resources of the information handling system, determine by the management controller whether one or more processor-attached storage resources are present in the information handling system, wherein the one or more processor-attached storage resources are coupled to the processor by other than a backplane of the information handling system, and responsive to determining that one or more processor-attached storage resources are present, execute by the management controller an adaptable virtual backplane that emulates a physical backplane to the management application as if the physical backplane were interfaced between the management application and the processor-attached storage resources.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
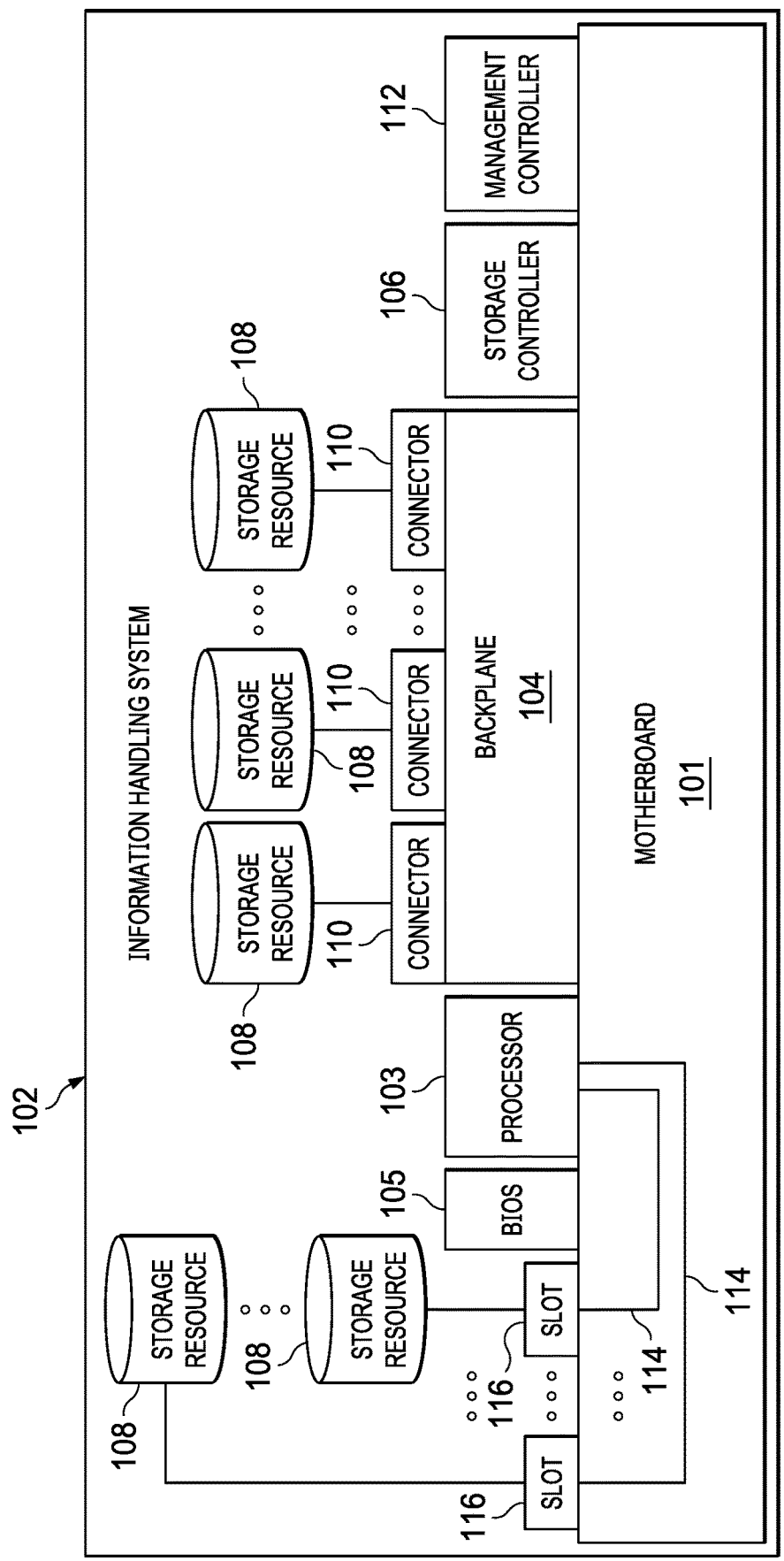
FIG. 1 illustrates a block diagram of selected components of an example information handling system, in accordance with embodiments of the present disclosure.
Figure 2:
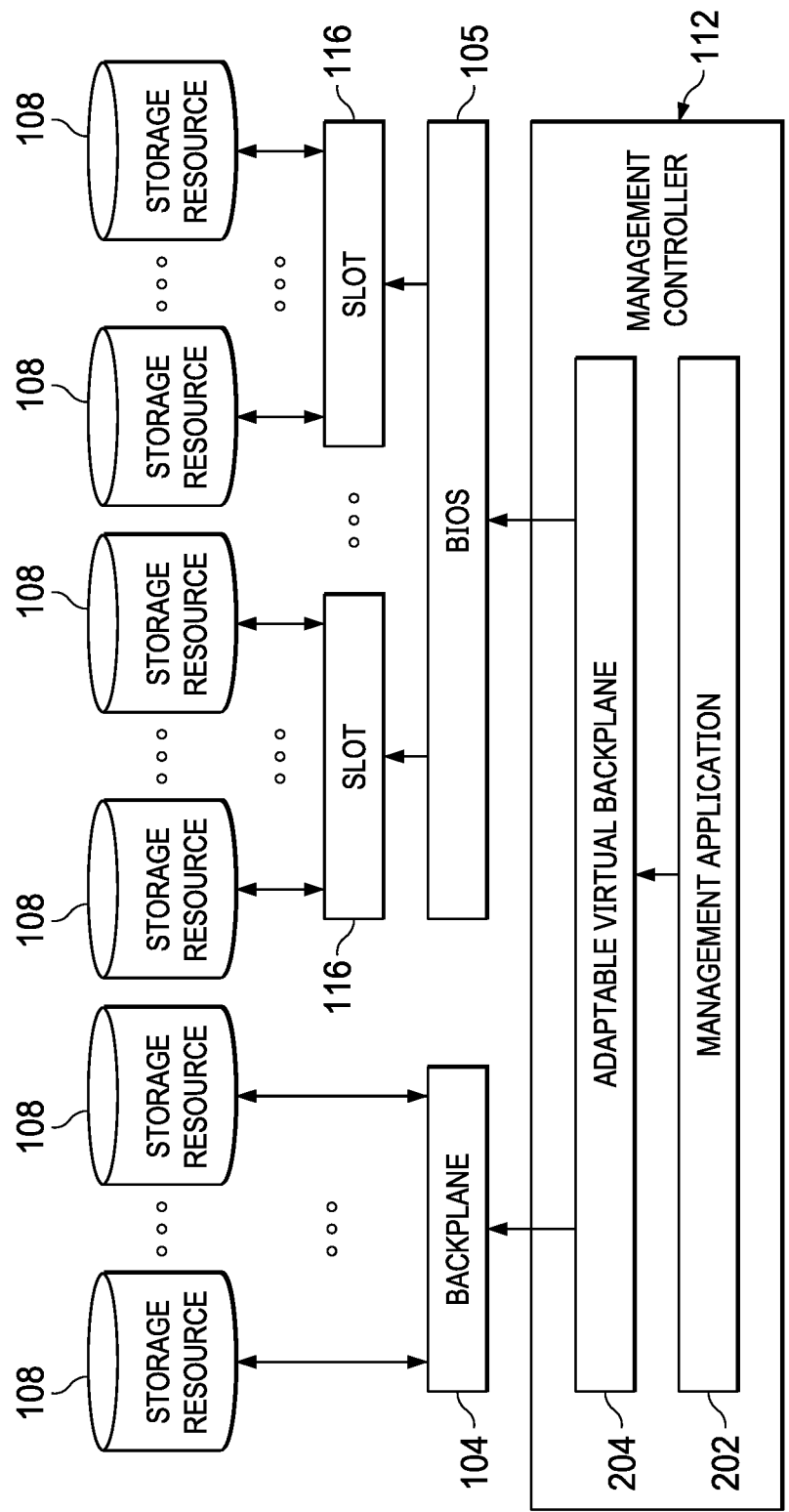
FIG. 2 illustrates a block diagram of a storage architecture using an adaptable virtual backplane, in accordance with embodiments of the present disclosure.
Figure 3:
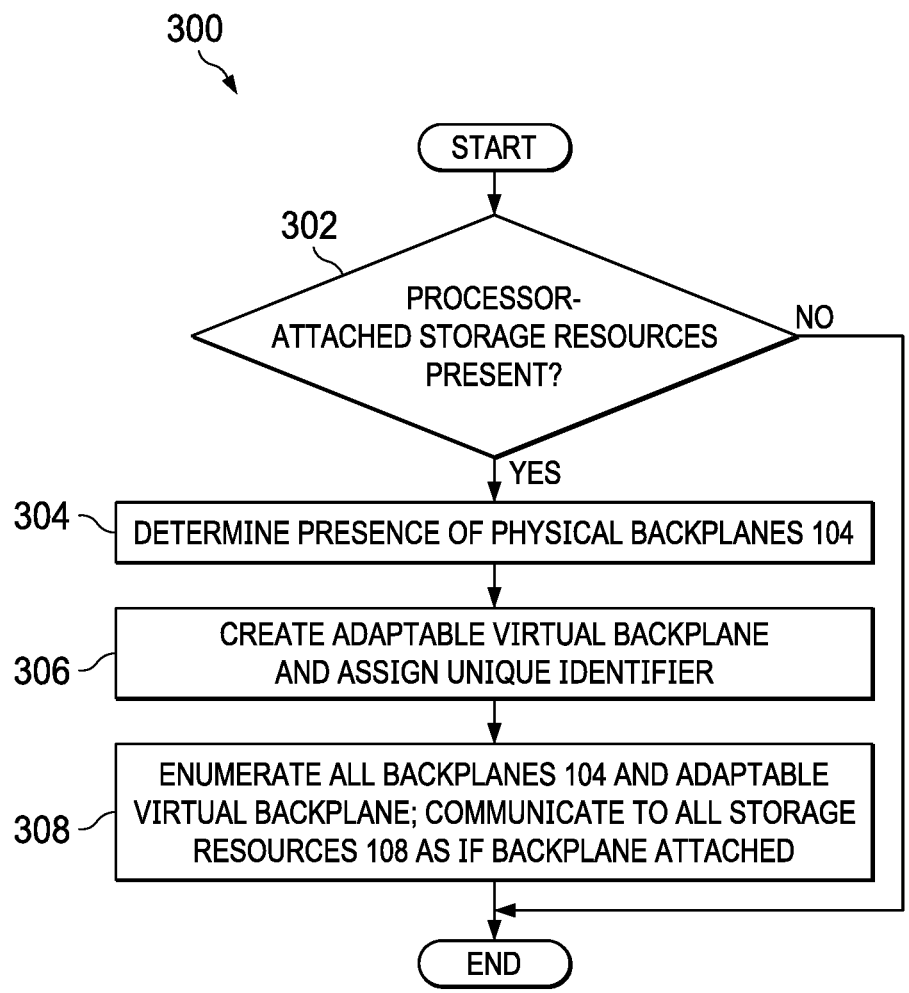
FIG. 3 illustrates a flow chart of an example method for configuring an information handling system for using an adaptable virtual backplane, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs), etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of an example information handling system 102. In some embodiments, information handling system 102 may comprise a server. In other embodiments, information handling system 102 may comprise networking equipment for facilitating communication over a communication network. In yet other embodiments, information handling system 102 may comprise a personal computer, such as a laptop, notebook, or desktop computer.

As shown in FIG. 1, information handling system 102 may include a motherboard 101, a processor 103 coupled to motherboard 101, a backplane 104 coupled to motherboard 101, a basic input/output system (BIOS) 105 coupled to motherboard 101, a storage controller 106 coupled to motherboard 101, a plurality of connectors 110 mechanically and electrically coupled to backplane 104, a plurality of slots 116 mechanically and electrically coupled to motherboard 101, a plurality of backplane-attached storage resources 108 each electrically coupled to backplane 104 via a respective connector 110, a plurality of processor-attached storage resources 108 each electrically coupled to processor 103 via Peripheral Component Interconnect Express (PCIe) lanes 114 and slots 116, and a management controller 112 coupled to motherboard 101. Motherboard 101 may comprise a circuit board configured to provide structural support for one or more information handling resources of information handling system 102 and/or electrically couple one or more of such information handling resources to each other and/or to other electric or electronic components external to information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource 108, memory and/or another component of information handling system 102.

Backplane 104 may comprise any system, device, or apparatus configured to interconnect information handling system 102 with information handling resources of information handling system 102. As shown, backplane 104 may have a plurality of connectors 110 mechanically and electrically coupled thereto.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

A connector 110 may comprise any system, device, or apparatus fixedly mounted on backplane 104 and may be constructed to mechanically couple a corresponding storage resource 108 to backplane 104 and to electrically couple such storage resource 108 to backplane 104, processor 103, and/or other components of information handling system 102. Connector 110 may include a receptacle slot or other opening configured to removably receive a corresponding mating edge connector of a storage resource 108.

A slot 116 may comprise any system, device, or apparatus fixedly mounted on motherboard 101 and may be constructed to mechanically couple a corresponding storage resource 108 to motherboard 101 and to electrically couple such storage resource 108 to motherboard 101, processor 103, and/or other components of information handling system 102. Slot 110 may include a receptacle slot or other opening configured to removably receive a corresponding mating edge connector of a storage resource 108.

Storage controller 106 may include any system, apparatus, or device operable to manage the communication of data between processor 103 and one or more of backplane-attached storage resources 108 coupled to backplane 104 via connectors 110. In certain embodiments, storage controller 106 may provide functionality including, without limitation, disk aggregation and redundancy (e.g., RAID), I/O routing, and error detection and recovery. As shown in FIG. 1, storage controller 106 may be coupled to backplane 104 (e.g., via a connector, as described in greater detail below) and motherboard 101 (e.g., via another connector, as described in greater detail below). Storage controller 106 may also have features supporting shared storage and high availability. In some embodiments, storage controller 106 may comprise a PowerEdge RAID Controller (PERC) manufactured by Dell Inc.

Backplane-attached storage resources 108 may be mechanically and electrically coupled to backplane 104 via respective connectors 110, and thus also electrically coupled to storage controller 106 and/or processor 103. Processor-attached storage resources 108 may be mechanically and electrically coupled to processor 103 via PCIe lanes 114. A storage resource 108 may comprise any system, device, or apparatus configured to retain program instructions and/or data for a period of time (e.g., computer-readable media). Storage resources 108 may include hard disk drives, magnetic tape libraries, optical disk drives, magneto-optical disk drives, compact disk drives, compact disk arrays, disk array controllers, and/or any other system, apparatus or device operable to store media.

Management controller 112 may be communicatively coupled processor 103 and may comprise any system, device, or apparatus configured to facilitate management and/or control of information handling system 102, and/or one or more of its component information handling resources. Management controller 112 may be configured to issue commands and/or other signals to manage and/or control information handling resources of information handling system 102. Management controller 112 may comprise a microprocessor, microcontroller, DSP, ASIC, field programmable gate array ("FPGA"), EEPROM, or any combination thereof.

In addition or alternatively, management controller 112 may also provide a management console for user/administrator access to these functions. For example, management controller 112 may provide for communication with a user interface, permitting a user to interact with management controller 112 and configure control and management of components of information handling system 102 by management controller 112. As another example, management controller 112 may act as a proxy and establish communication between two information handling resources by either configuring them to directly couple to each other or transfer information by receiving information from one information handling resource, processing the information if needed, and then transferring the information to the other information handling resource. As a further example, management controller 112 may implement Web Services Management ("WS-MAN") or another suitable management protocol permitting a user to remotely access a management controller 112 to configure information handling system 102 and its various information handling resources. In such embodiments, management controller 112 may interface with a network interface separate from a traditional network interface of information handling system 102, thus allowing for "out-of-band" control of information handling system 102, such that communications to and from management controller 112 are communicated via a management channel physically isolated from an "in band" communication channel with the traditional network interface. Thus, for example, if a failure occurs in information handling system 102 that prevents an administrator from interfacing with information handling system 102 via a traditional network interface and/or user interface (e.g., operating system failure, power failure, etc.), the administrator may still be able to monitor and/or manage information handling system 102 (e.g., to diagnose problems that may have caused failure) via management controller 112. In the same or alternative embodiments, management controller 112 may allow an administrator to remotely manage one or more parameters associated with operation of information handling system 102 and its various information handling resources (e.g., power usage, processor allocation, memory allocation, security privileges, etc.). In certain embodiments, management controller 112 may include or may be an integral part of a chassis management controller (CMC), a baseboard management controller (BMC), Dell Remote Management controller (DRAC) or an Integrated Dell Remote Management controller (iDRAC). In these and other embodiments, management controller 112 may also be referred to as an access controller or a life-cycle controller.

A PCIe lane 114 may comprise an electronically communicative pathway between processor 103 and a processor-attached storage resource 108 or another device which facilitates communication between a processor-attached storage resource 108 and processor 103. In some embodiments, a PCIe lane 114 may have functionality in accordance with a PCIe standard. In addition, although PCIe lanes 114 are shown in FIG. 1 as providing an interface between processor-attached storage resources 108 and processor 103, in some embodiments an interface other than PCIe and PCIe lanes 114 may be used to communicatively couple processor-attached storage resources 108 to processor 103.

In addition to motherboard 101, processor 103, backplane 104, BIOS 105, connectors 110, slots 116, storage controller 106, storage resources 108, management controller 112, and PCIe lanes 114, information handling system 102 may include one or more other information handling resources.

FIG. 2 illustrates a block diagram of a storage architecture using an adaptable virtual backplane 204, in accordance with embodiments of the present disclosure. As shown in FIG. 2, management controller 112 may be configured to execute one or more management applications 202 and an adaptable virtual backplane 204.

A management application 202 may comprise any suitable program of instructions embodied in software and/or firmware of management controller 112 and configured to perform a management function of management controller 112. For example, a management function may include thermal monitoring and/or control, real-time disk drive monitoring, diagnostics, or other suitable management functions.

Adaptive virtual backplane 204 may comprise any suitable program of instructions embodied in software and/or firmware of management controller 112 and configured to emulate a physical backplane (e.g., backplane 104) to one or more management applications 202, thus providing a logical interface between management applications 202 and processor attached-storage devices 108. Thus, in operation, management applications 202 may communicate with adaptable virtual backplane 204 as if it were a physical backplane and may provide a logically suitable interface to slots 116 to enable communication between management applications and processor-attached storage resources 108 as if processor-attached storage resources 108 were coupled to processor 103 via a physical backplane. Accordingly, adaptive virtual backplane 204 may be configured to maintain storage mapping and drive presence information for processor-attached storage resources 108.

As shown in FIG. 2, adaptable virtual backplane 204 may interface with BIOS 105, in order to utilize the fact that BIOS 105 may communicate information regarding processor-attached storage resources 108 to management controller 112 during power-on self test of information handling system 102.

FIG. 3 illustrates a flow chart of an example method 300 for configuring an information handling system for using an adaptable virtual backplane, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, during boot of management controller 112, management controller 112 may determine if information handling system 102 includes any processor-attached storage resources 108. If management controller 112 determines that information handling system 102 includes one or more processor-attached storage resources 108, method 300 may proceed to step 304. Otherwise, method 300 may end.

At step 304, management controller 112 may determine if any physical backplanes 104 exist within information handling system 102. At step 306, management controller 112 may create adaptable virtual backplane 204, and assign adaptable virtual backplane 204 an identifier that is unique from any physical backplanes 104 present within information handling system 102.

At step 308, one or more management applications 202 may enumerate all physical backplanes 104 and adaptive virtual backplane 204, and communicate to both backplane-attached storage resources 108 and processor-attached storage resources 108 as if all storage resources 108 were backplane-attached.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor; and
a management controller communicatively coupled to the processor and configured to provide management of the information handling system and further configured to:
execute a management application for management of non-volatile storage resources of the information handling system including one or more backplane-attached storage resources that are coupled to the processor by a connection that includes a backplane, and further including one or more processor-attached storage resources that are coupled to the processor by a connection that does not include a backplane;

determine that the one or more processor-attached storage resources are present in the information handling system; and responsive to determining that the one or more processor-attached storage resources are present, execute an adaptable virtual backplane that emulates a physical backplane to the management application as if the physical backplane were interfaced between the management application and the processor-attached storage resources, such that the management application is operable to manage both the backplane-attached storage resources and the processor-attached storage resources.

2. The information handling system of claim 1, wherein the adaptable virtual backplane is configured to maintain a mapping of the one or more processor-attached storage resources to enable management of the one or more processor-attached storage resources by the management application.

3. The information handling system of claim 1, wherein the management application is configured to perform a management function comprising one of thermal monitoring and control, real-time disk drive monitoring, and diagnostics, of the one or more processor-attached storage resources.

4. The information handling system of claim 1, wherein each of the one or more processor-attached storage resources are coupled to the processor via a corresponding slot of a motherboard upon which the processor is disposed.

5. The information handling system of claim 4, wherein the slot comprises a Peripheral Component Interconnect Express slot.

6. A method comprising, in an information handling system comprising a processor and a management controller communicatively coupled to the processor and configured to provide management of the information handling system:

executing by the management controller a management application for management of non-volatile storage resources of the information handling system including one or more backplane-attached storage resources that are coupled to the processor by a connection that includes a backplane, and further including one or more processor-attached storage resources that are coupled to the processor by a connection that does not include a backplane;

determining by the management controller that the one or more processor-attached storage resources are present in the information handling system; and responsive to determining that the one or more processor-attached storage resources are present, executing by the management controller an adaptable virtual backplane that emulates a physical backplane to the management application as if the physical backplane were interfaced between the management application and the processor-attached storage resources, such that the management application manages both the backplane-attached storage resources and the processor-attached storage resources.

7. The method of claim 6, further comprising maintaining by the adaptable virtual backplane a mapping of the one or more processor-attached storage resources to enable management of the one or more processor-attached storage resources by the management application.

8. The method of claim 6, wherein the management application performs a management function comprising one of thermal monitoring and control, real-time disk drive monitoring, and diagnostics, of the one or more processor-attached storage resources.

9. The method of claim 6, wherein each of the one or more processor-attached storage resources are coupled to the processor via a corresponding slot of a motherboard upon which the processor is disposed.

10. The method of claim 9, wherein the slot comprises a Peripheral Component Interconnect Express slot.

11. An article of manufacture comprising:

a non-transitory computer-readable medium; and computer-executable instructions carried on the computer-readable medium, the instructions readable by a processor of an information handling system comprising a management controller communicatively coupled to the processor and configured to provide management of the information handling system:

execute by the management controller a management application for management of non-volatile storage resources of the information handling system including one or more backplane-attached storage resources that are coupled to the processor by a connection that includes a backplane, and further including one or more processor-attached storage resources that are coupled to the processor by a connection that does not include a backplane;

determine by the management controller that the one or more processor-attached storage resources are present in the information handling system; and responsive to determining that the one or more processor-attached storage resources are present, execute by the management controller an adaptable virtual backplane that emulates a physical backplane to the management application as if the physical backplane were interfaced between the management application and the processor-attached storage resources, such that the management application is operable to manage both the backplane-attached storage resources and the processor-attached storage resources.

12. The article of claim 11, the instructions for further causing the adaptable virtual backplane to maintain a mapping of the one or more processor-attached storage resources to enable management of the one or more processor-attached storage resources by the management application.

13. The article of claim 11, wherein the management application is configured to perform a management function comprising one of thermal monitoring and control, real-time disk drive monitoring, and diagnostics, of the one or more processor-attached storage resources.

14. The article of claim 11, wherein each of the one or more processor-attached storage resources are coupled to the processor via a corresponding slot of a motherboard upon which the processor is disposed.

15. The article of claim 14, wherein the slot comprises a Peripheral Component Interconnect Express slot.

* * * * *